Aug. 6, 1957 D. KUHLENSCHMIDT ET AL 2,801,582
INTAKE AND EXHAUST DAMPER CONTROL FOR AIR
CONDITIONING APPARATUS
Filed Oct. 1, 1954 5 Sheets-Sheet 5
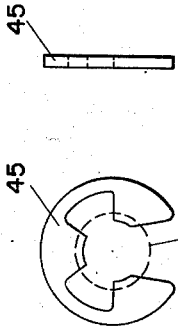
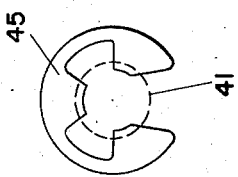
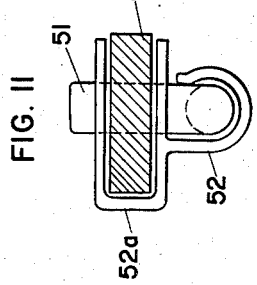
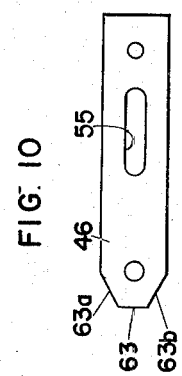
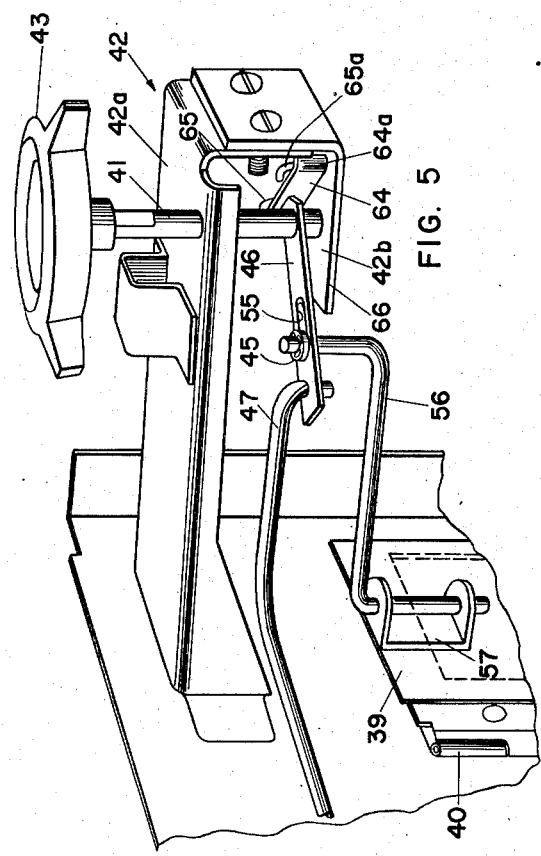
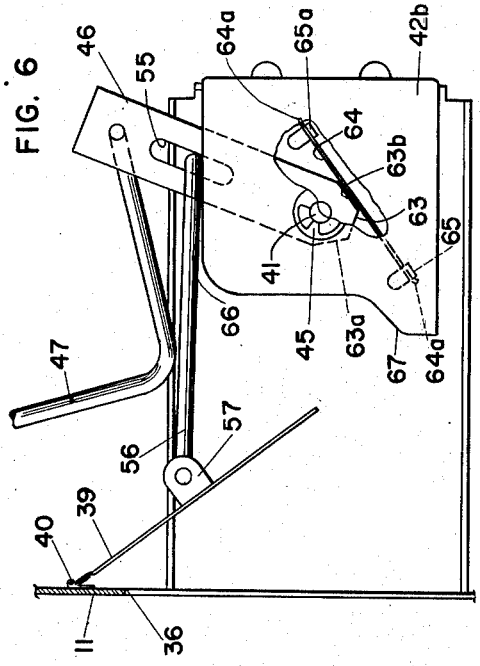
INVENTOR.
DONALD KUHLENSCHMIDT
CURTIS O. FOWLER
BY Paul O. Pippes
ATTY.

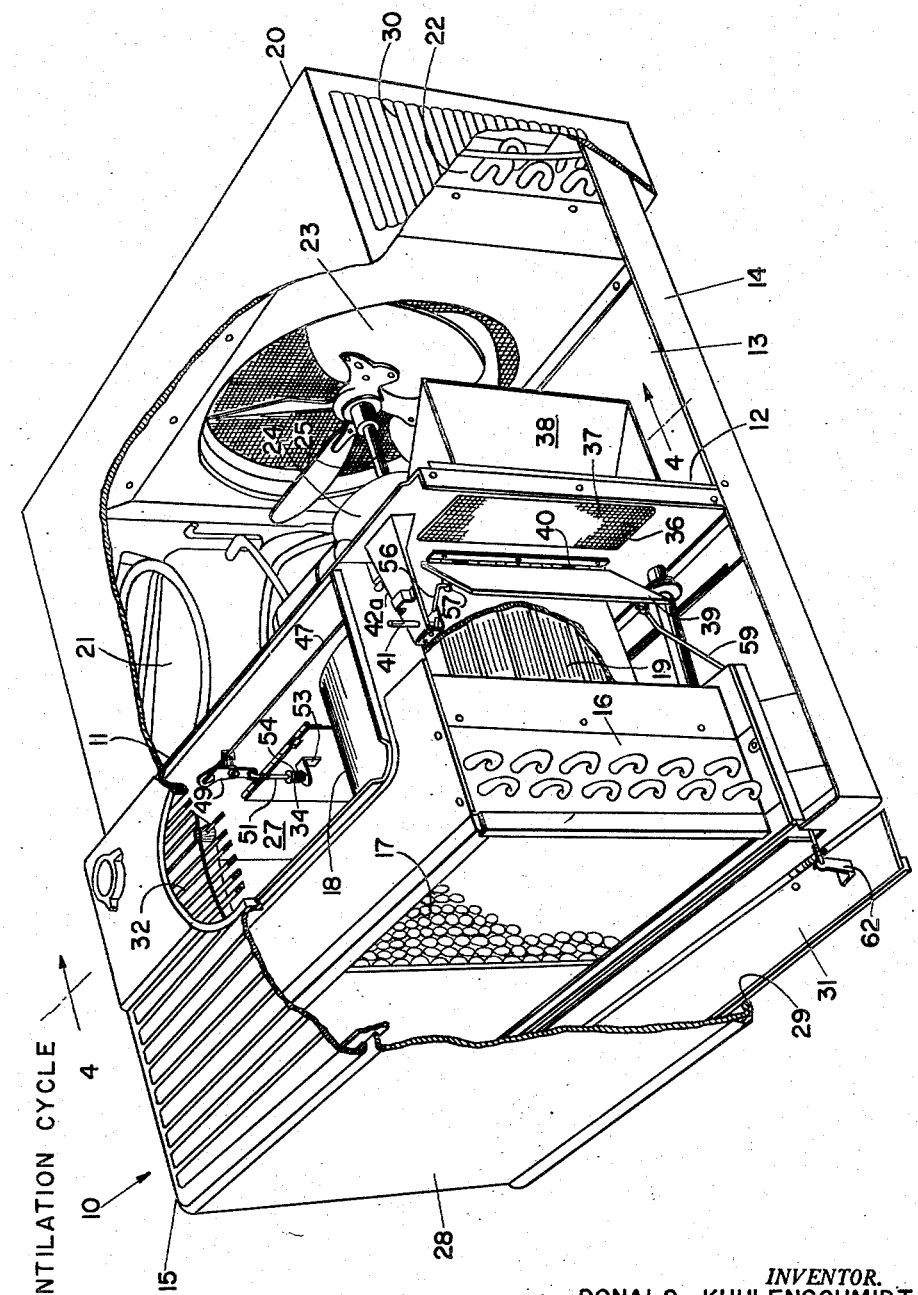

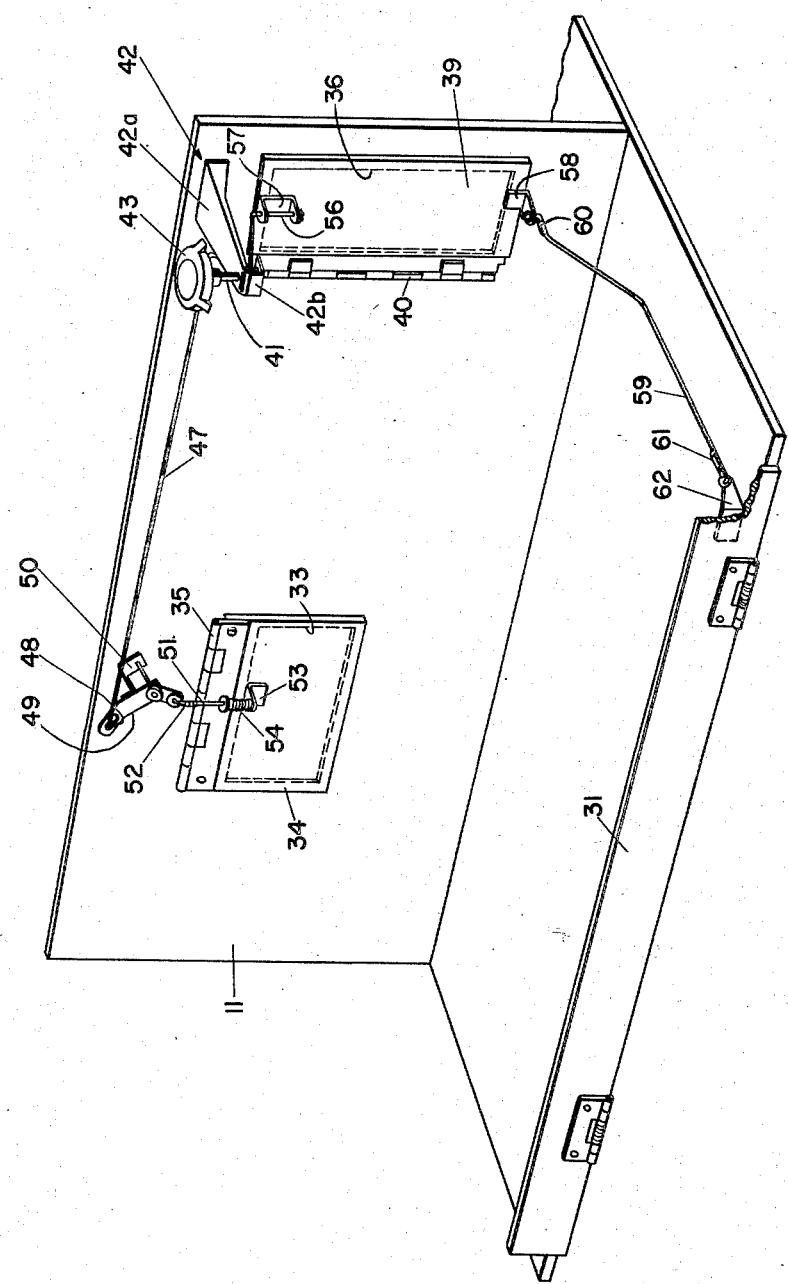

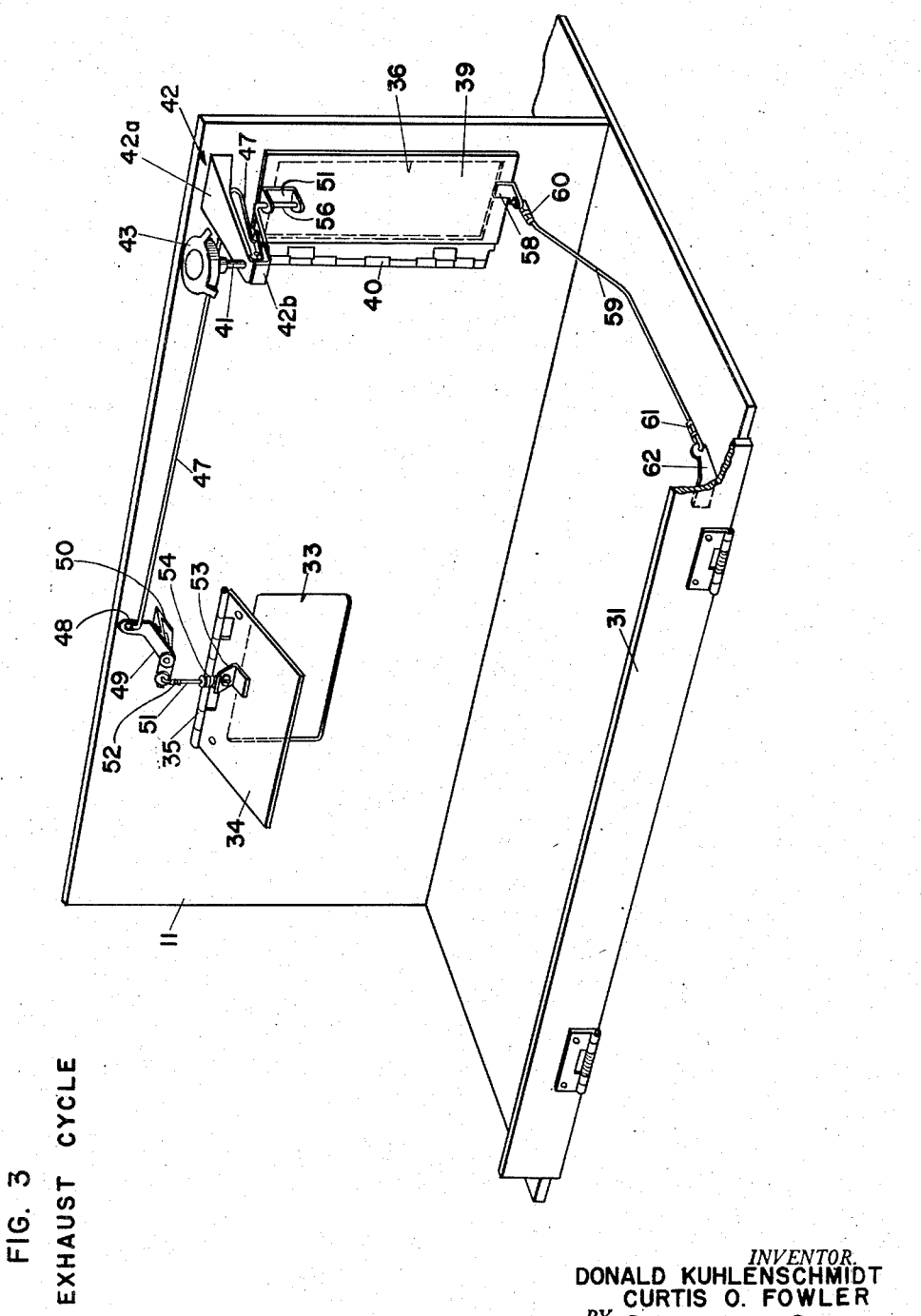

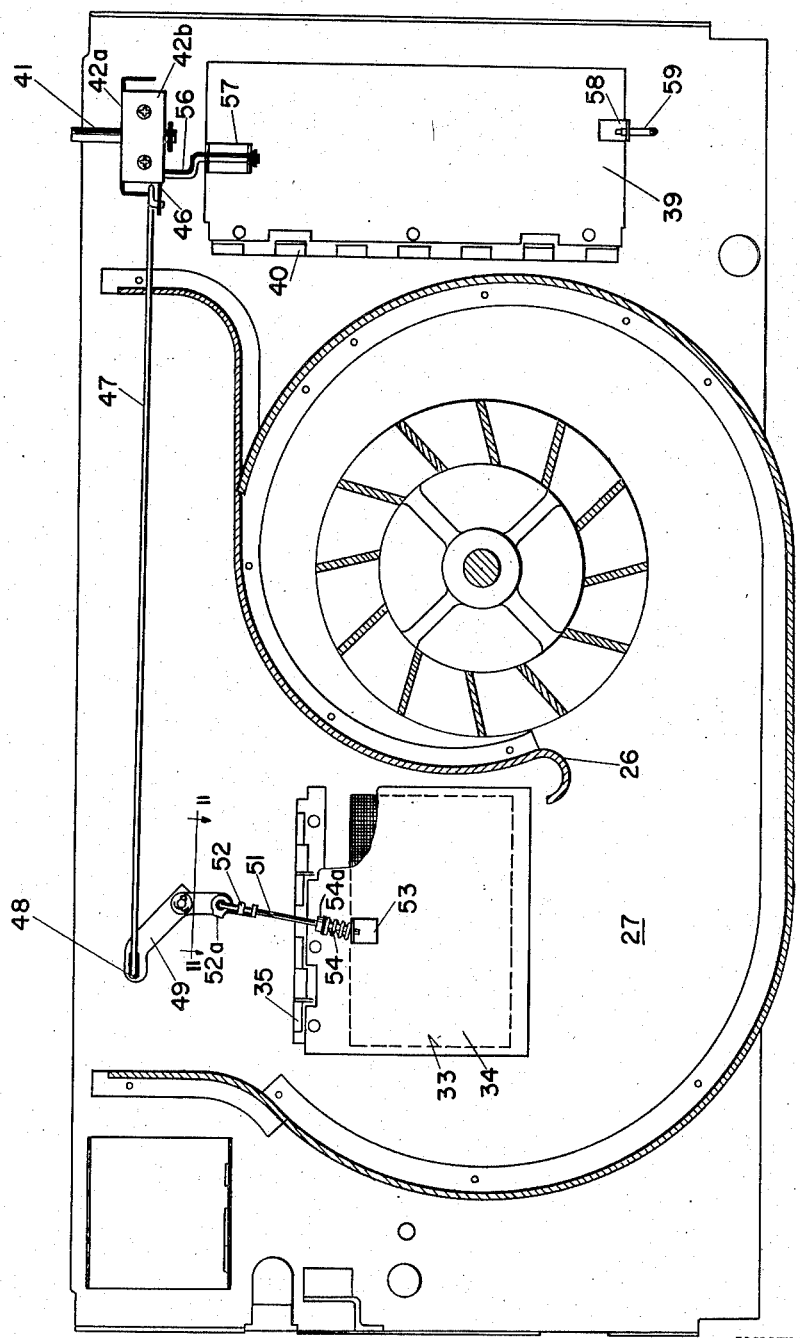

United States Patent Office 2,801,582
Patented Aug. 6, 1957

2,801,582

INTAKE AND EXHAUST DAMPER CONTROL FOR AIR CONDITIONING APPARATUS

Donald Kuhlenschmidt, Newburgh, and Curtis O. Fowler, Spurgeon, Ind., assignors, by mesne assignments, to Whirlpool-Seeger Corporation, a corporation of Delaware Application October 1, 1954, Serial No. 459,753

5 Claims. (Cl. 98—94)

This invention relates to air conditioning units of the type generally provided for window mounting in the room to be cooled. More specifically, however, it is directed to the controls for operating the intake and exhaust dampers that regulate air flow through the unit.

In units of this type it is frequently customary to control the flow of air therewithin by means of dampers selectively operable over openings in the unit for regulating either, recirculation of air through the unit from the room, intake of fresh or make-up air from outside atmosphere, or exhaustion and evacuation of stale air to the outer atmosphere. Usually dampers of this type are manually operated through a mechanism involving a plurality of control elements which, in many instances, are interlocked and operable one with the other, while in other arrangements they are individually operated when required. Two such coordinated control mechanisms are shown in the copending U. S. applications, Serial Nos. 419,862 and 419,863, respectively, assigned to the same assignee as the instant invention. The present invention represents not only an improvement over these latter two devices but additionally aims to provide a mechanism that circumvents the common complaint extent in the past to the effect that devices of this general character involved complicated structures that were expensive to fabricate and service, and, unless properly operated by relatively skilled users, would not produce entirely satisfactory air flow control results in such air conditioning units.

It is a prime object of this invention, therefore, to provide an improved air conditioning unit having a simplified, effective and inexpensive air flow control means therein.

Another primary object is to provide a simple and co-ordinated control mechanism operable from a common control element for regulating the flow of air through an air conditioning unit.

A further object is to provide a plurality of dampers operable from a single control element in an air conditioning unit for regulating air flow therethrough.

A still further object is to provide an air conditioning unit in which the means for admitting fresh air, exhausting stale air, and regulating recirculation of room air are all operable from a common control element.

Another important object is to provide an air conditioning unit arranged with independent exhaust and fresh-air intake means that are individually operable from a common control element.

A further important object is to provide an air conditioning unit in which the damper for controlling exhaust of stale air is connected by lost-motion linkage mechanism to a common rotatable control element also connected by lost-motion mechanism to a damper for controlling the flow of fresh air into the unit and wherein either of said dampers may be selectively operated by actuation of said common control element.

Another primary object is to provide an air conditioning unit wherein the actuating members for the exhaust and fresh-air dampers are both connected to a common crank-like member, in turn, affixed to a rotatable control element so arranged that said dampers are selectively operable by actuation of said common control element.

Further objects and advantages of the present invention will be apparent from the full description, reference being had to the accompanying drawings wherein a preferred form of the invention is clearly shown.

Fig. 1 is a perspective view, partially cut away to better show the components thereof, of a window mounted air conditioning unit incorporating the present invention and showing the air flow control mechanism thereof in position for directing fresh air, admitted from outside atmosphere, into the air stream of the room being conditioned.

Fig. 2 is a skeletonized perspective of the air flow control mechanism of the present invention with said mechanism shown in position for recirculating room air through the unit and back into the room being conditioned.

Fig. 3 is a view similar to that of Fig. 2 but arranged with the air flow controls in position to exhaust stale air from the room being conditioned.

Fig. 4 is a sectional view taken on line 4—4 of Fig. 1, but with the controls set as shown in the skeletonized view of Fig. 2, to effect recirculation of air.

Fig. 5 is a perspective, in enlarged detail, of a portion of the air flow control mechanism and showing particularly the manually operable common control element with its mounting means.

Fig. 6 is a bottom plan view of the common control element shown in Fig. 5, but with a portion of the mounting bracket broken away to show the indexing and stop means.

Fig. 7 is an elevational detail of one of the snap-on retaining rings employed for securing the end portions of the rotating elements.

Fig. 8 is a side elevation of the retaining ring shown in Fig. 7.

Fig. 9 is a cut-away view showing a retaining ring in position proximate the end of a rotatable element.

Fig. 10 is a plan view of the crank arm provided for mounting on the common control element.

Fig. 11 is a section taken on line 11—11 of Fig. 4 but on a greatly enlarged scale and shows the clevis clip in greater detail.

For purposes of illustrating one preferred application of the present invention the drawings herein are selected to show a self-contained air conditioning unit, of the type generally adapted for mounting in the window of a room to be cooled or conditioned and having the features of the invention forming a part thereof. It will be appreciated, however, by those skilled in the art, that the present invention is not limited to the specific construction illustrated but is likewise readily applicable to other types of air conditioning units without deviating from the inventive concepts hereof.

In the particular embodiment selected for illustrating the present invention there is shown a self-contained air conditioning unit, represented generally by the reference numeral 10, which includes an inner cabinet or cooling compartment portion that extends into the room, and an outer cabinet or apparatus compartment portion that extends into the outside atmosphere. A wall member 11 having a layer of heat insulating material 12 thereon is positioned to serve as a dividing or common wall between the two portions of the unit, which portions, in turn, are mounted on a supporting base or frame 13 fashioned with upwardly flanged marginal edges 14.

The inner cabinet or cooling compartment portion of the unit is formed by an open-bottom housing or casing 15 removably positioned over the inwardly projecting portion of base 13 which carries that portion of the cooling apparatus components which include a shrouded evaporator 16, a filter element 17, a blower fan shroud or scroll housing 18 and a blower fan 19. The outer cabinet or apparatus compartment portion of the unit is formed by an open-ended casing or housing 20 positionable around the outwardly projecting portion of the base 13 and which carries a motor-compressor 21, a shrouded condenser 22, a condenser fan 23 and a fan motor 24. Said latter housing or casing may additionally serve as a mounting structure for fixedly positioning said unit in a window frame.

The fan motor 24, which, preferably, is provided with a double-ended shaft 25, also drives the blower evaporator fan 19 mounted within the scroll-like housing 18. Said scroll housing being conventional in form is provided with an axial opening (not shown) that adjoins and opens into the shrouded evaporator 16, and a peripheral outlet or opening 26 (Fig. 4) that opens into a discharge chamber or compartment 27 formed within and extending to the top of said inner cabinet portion.

The base or supporting frame 13 is dimensioned so that the front flanged edge 14 thereof will be spaced from the front wall 28, of the inner cabinet housing 15, to provide an elongated opening 29 for admitting air from the room into the unit after said cabinet housing has been placed in position over said base.

As is well understood by those skilled in the art the evaporator, compressor, and condenser units are interconnected with refrigerant carrying conduits, which for drawing simplification purposes have not been shown, and, further, the system is filled with suitable refrigerant in accordance with standard practices in the industry.

In the side wall of the outer cabinet housing 20 louvered openings 30 may be provided to admit outside air which is then circulated therearound by the fan 23 and afterwards discharged through the condenser 22 back into the outside atmosphere by way of an opening (not shown) in the rear wall of said housing. Air from the room being cooled or conditioned passes into the inner cabinet 15 by way of the elongated opening 29, which, preferably, is covered by a hingedly mounted damper 31, and thence through the filter element 17 and into heat exchange relation with the evaporator 16, and thereafter through the blower 19 and into the chamber 27 from which it may subsequently be discharged back into the room by way of the louvered openings 32, a portion of only one of which is shown in the drawings, in the top of said inner cabinet housing.

For purposes of regulating either the flow of air through the unit, exhausting stale air, or admitting fresh air there are provided a plurality of air passages or openings which may be covered over or closed up by damper means, selectively operable for restricting the passage or flow of air through any of such openings as may be individually required, to obtain the particular degree of regulation or control desired. In the dividing wall 11 and adjoining the discharge chamber 27 there is provided an opening or passageway 33 (Fig. 3) through which stale or contaminated air may be removed from the room and exhausted into the outer cabinet 20, from whence it is subsequently discharged into the outside atmosphere. A damper or panel-like closure member 34 is hingedly mounted, on said dividing wall over said opening, by suitable horizontally disposed hinges 35 which are spring-biased to maintain said damper normally closed. A second opening 36, in said dividing wall and having a screen 37 thereover, adjoins an angularly formed vestibule-like passageway or compartment 38 which opens, by way of a side wall opening (not shown) in the outer housing 20, into the outside atmosphere to provide inlet means for admitting fresh or make-up air into the inner cabinet 15. A damper or panel-like closure member 39 is hingedly mounted on said dividing wall, by suitable vertically disposed hinges 40, and is positionable for partially or completely closing the opening 36 with the said hinges being spring-biased to maintain this damper normally closed.

The damper elements 31, 34 and 39, preferably, are interconnected and arranged for selective operation from a common control. A control element, in the form of a rod or shaft 41, is pivotally mounted or journaled in a two-piece bracket 42 fashioned with a long upper arm 42a and a short lower arm 42b with the upper arm mounted, by suitable conventional securing means, on the dividing wall member 11. Affixed to one end of said control rod is an indicator-like manually-operable control knob 43, while the opposite end portion of said rod has an annular groove 44 into which a retaining ring 45 is snap fitted to prevent accidental removal of said rod from its pivotal support in the lower arm 42b of said mounting bracket.

A crank arm or link member 46 is securely affixed proximate one of its ends to the control rod 41 and is adapted for rotation therewith. The opposite end of said crank arm has one end of a traverse rod 47 pivotally connected thereto while the opposite end of said traverse rod is slidably mounted in a longitudinally extending slotted opening 48 disposed proximate one end of a bellcrank lever 49. Said bellcrank is pivotally mounted for rotation on a supporting pedestal-like bracket 50, which, in turn, is fixedly mounted by conventional means on the dividing wall 11. One end of a second traverse or pull rod 51 is pivotally mounted in the free end of said bellcrank and secured thereto by suitable removable means, such as the conventional clevis clip 52, while the opposite end of said latter pull rod is pivotally mounted in an angled bracket 53, which, in turn, is affixed to the exhaust damper panel member 34. A coil spring 54 positioned around said pull rod, with one end abutting the bracket 53 and the other end abutting a stud or cotter pin 54a affixed to the rod 51, is provided to compensate for tolerances in the linkage mechanism and to aid in over-centering the bellcrank 49 to prevent the damper 34 from being accidentally opened. When the damper 34 is closed any pressure thereon from the outside will tend to press the bracket 53 against the spring 54 which, in turn, will force rod 51 upwardly tending to rotate the bellcrank 49 counterclockwise, as viewed in Fig. 4, but the turned-over portion 52a, on the clevis clip 52, will abut the bellcrank when so rotated and act as a stop to prevent any further rotation of said bellcrank or any further movement of said damper as a result of pressure thereon except for the limited amount of movement that may be permitted by compressing of the spring 54.

The crank arm 46 is also provided with a slotted opening 55, disposed proximate the end thereof that carries the traverse rod 47, for slidably receiving one end of a generally Z-shaped traverse or pull rod 56 which may be suitably retained slidably positioned therewithin by any conventional means, such as the retaining clip member 45. The opposite end of said traverse or pull rod 56, in turn, is pivotally mounted in a bracket support 57 that is affixed to the damper panel 39 for movement therewith.

An angled bracket 58, suitably affixed to the ventilation damper member 39 proximate the lower edge thereof, has one end of a deformed traverse or pull rod 59 pivotally mounted therein and removably secured thereto by suitable means such as the conventional clevis clip 60, while the opposite end of said deformed pull rod is similarly removably mounted by a clevis 61 in an angled bracket 62 which, in turn, is fastened to the recirculation damper panel 31.

The crank arm or link member 46 is fashioned with three contiguous flat surfaces 63, 63a and 63b (as best shown in Figs. 6 and 10) on one end thereof, to provide stopping and indexing positions for the crank arm as it is rotated by the control rod 41. A resilient member, in the form of a substantially flat leaf spring 64, is positioned with one face or side surface thereof abutting the spaced-apart posts or supports 65 and 65a, which, if desired, may be punched up from the lower bracket member 42b, while the other face or side surface thereof contacts or engages one of the detent surfaces 63, 63a or 63b on the end of the crank arm 46. In this manner the resilient member 64 is continuously exerting a force or pressure against one of said detent surfaces thus preventing the control mechanism from accidentally rotating out of any desired or preselected setting or position. As the control rod 41 is manually rotated the flat detent surfaces 63, 63a and 63b, being cooperatively disposed or located according to the respective opened and closed positions of the dampers, will serve to indicate to the operator thereof the exact location or point at which turning of the control knob may cease for any particular control setting. The end edge portions 64a of the spring member 64 and the top edge portions of the post supports 65 and 65a may be flanged over, if desired, so as to more securely lock or position said spring in place.

The edge surface 66, of the bracket arm 42b, provides a cam-like guide for the traverse rod 56 and thus gives a more positive action to the closing of the ventilation damper 39. With this guide arrangement it has been found that the closing action of this damper is more positively controlled by the crank arm 46 and that the guiding action thereof supplements or aids the biasing action of the spring hinges 40 and thereby permits the use of lighter springs in said hinges. It will be appreciated, of course, that the use of lighter springs is particularly advantageous in the opening operation because then the damper may be opened with greater ease.

The edge surface 67 of the bracket arm 42b, provides a convenient over-riding stop when the control rod 41 is turned clockwise such as for the exhaust cycle.

During the normal or cooling operation, air from the room being cooled or conditioned is continuously recirculated from the room through the unit, where heat picked up from the room is removed, and back into the room again. With the cooling cycle in operation and recirculation taking place the damper 31 is open, leaving the inlet 29 unrestricted to the flow of air from the room, and the openings 33 and 36 are closed to the passage of air therethrough by their respective dampers 34 and 39. In this position of the damper control mechanism, illustrated in Fig. 2, the control rod 41 is in what may be termed a first or neutral position. With the rod thus disposed the crank arm 46 is in its mid-position with the detent surface 63 on the end thereof in engagement with the spring member 64, while the traverse rod 47 rests at the left-hand end of the slotted opening 48, in the bellcrank 49, and the traverse rod 56 rests at one end of the slotted opening 55 in said crank. With the traverse rods 47 and 56 thus positioned the biasing springs in the hinges 35 and 40 are unopposed in their effort to retain the dampers 34 and 39, respectively, in their closed positions. In this neutral or first position of the controls the room air is free to pass by way of the elongated inlet opening 29 past the damper 31 and through the filter 17 to the evaporator 16, where it is cooled, and then into the blower fan 19 from whence it is discharged by way of chamber 27 through the louvered outlet opening 32 back into the room at a lower temperature.

During the ventilating cycle fresh or make-up air is admitted to the unit while recirculation of room air therethrough is substantially restricted. In this second or ventilating position, illustrated in Fig. 1, the control rod 41 has been rotated counterclockwise approximately 74° so that the detent surface 63b, on the end of the crank 46, engages the spring member 64. With the control rod thus positioned the crank arm 46 has arcuately rotated the end of the traverse rod 47 through approximately 74° in a counterclockwise direction without disturbing the closed position of damper 34 over its respective opening 33. During this rotation the traverse rod 56 rides or slides along the slotted opening 55, in the crank 46, until it contacts the cam-like guide surface 66 on the lower bracket support 42b whereupon it gradually pulls the damper 39 away from the opening 36, in the dividing wall 11, against the restraining influence of its spring biased hinges 40. Upon opening of this latter damper the damper 31, which operates conjointly therewith through the interconnecting traverse rod 59, is closed and the opening 29 is restricted and hence the fresh air admitted into the inner cabinet through the opening 36 and the vestibule-like compartment 38 passes in through the filter element 17 and into the evaporator 16 to be subsequently discharged, by way of the louvered top outlet openings 32, into the room. In this manner fresh air may be admitted and passed through the unit and into the room without accidentally being by-passed or short-circuited into the exhaust opening and back into the atmosphere and never reaching the room. The pressure of the circulating fresh air acting against the inner surface of the exhaust damper 34 in its closed position tends to aid in sealing the opening 33 therebeneath and thereby supplements the spring hinges 35 in preventing the escape of any cooled air that should be directed to the room. Any inward pressure against the damper 34 from the outside atmosphere will have a tendency to throw the bellcrank 49 farther over center on the pedestal pivot 50 and, by virtue of the locking action of the clevis clip 52, as previously noted, further resist the opening of the damper 34.

During the evacuation cycle stale or foul air is exhausted or evacuated from the room into the outer cabinet by way of the exhaust opening 33. In this third or exhaust position of the controls, illustrated in Fig. 3, the control rod 41 has been rotated clockwise through approximately 148° so that the detent surface 63a, on the end of the crank 46, engages the spring member 64. As the crank arm 46 begins its clockwise rotation from its previous position the traverse rod 56 begins to slide along the slot 55 therein and at the same time closely contacts or follows the cam-like guide surface 66 until the rotation has proceeded approximately 74°. At this point the rod 56 will have reached the end of straight portion of the guide surface 66 and the spring-biased hinges 40 then become operative to close the damper 39 whereupon the rod 56 rides to the end of the slot 55 in said crank arm without in any way exerting force or pressure tending to oppose the biasing action of said spring hinges. Also during the first 74° of clockwise rotation of the crank arm from its previous position the traverse rod 47 rides freely in the slotted opening 48 and exerts no influence on the damper 34 which remains closed by virtue of the biasing action of the spring hinges 35. However, after the crank arm has rotated past its first or so-called neutral position the traverse rod 47 begins to slide along the slotted opening 48, in the bellcrank 49, until it reaches the end thereof. Further rotation of the crank arm then will cause said bellcrank to rotate about its pedestal support 50 and, through the cooperative action of the connecting traverse rod 51, open the damper 34 against the restraining force of the spring-biased hinges 35. Now as the recirculated room air is discharged from the blower fan 19 into the discharge chamber 27 a substantial portion thereof will impinge against the baffle-like outwardly extending exhaust damper 34 and be deflected into the opening 33 and into the outer cabinet 20 from whence it will subsequently be discharged by the condenser fan 23 into the outside atmosphere. In this manner evacuation or exhaustion of stale air from the room may be accomplished without interfering with the position of the closed fresh air or ventilating damper 39. Since the recirculation damper 31 is opened when the damper 39 is closed it will remain open during the exhaust operation and the flow of air from the room into the unit thus will not be restricted during the exhaust cycle.

Although only a preferred form of the invention has been illustrated, and that form described in detail, it will be apparent to those skilled in the art that various modifications may be made therein without departing from the spirit of the invention, or from the scope of the appended claims.

What is claimed is:

1. In a room air conditioning unit, the combination, comprising: an outer cabinet defining an apparatus compartment, an inner cabinet defining a cooling compartment, and a partition between said compartments; said cooling compartment having an air inlet and an air outlet communicating with a room to be cooled; said partition having a first opening therein communicating with both of said compartments for exhausting air from the room, and a second opening therein connecting the cooling compartment with the outside atmosphere for admitting fresh air to the room; first, second and third damper members pivotally mounted over the said first partition opening, said second partition opening, and said cooling compartment air inlet, respectively, and having said first and second dampers biased to closed positions; means operatively connecting said third damper to said second damper for conjoint movement therewith; a rotatable member having a crank arm affixed thereto and rotatable therewith; means including a traverse rod pivotally connected at one end to said second damper and slidably connected at its other end to said crank arm for opening said second damper when said rotatable member is rotated in one direction, and for assisting in the closing of said second damper when said rotatable member is rotated in the opposite direction; cam guide means disposed proximate said rotatable member and operative for controlling the path of the slidably connected end of said traverse rod during the opening and closing of said second damper; lost-motion linkage connecting said first damper to said crank arm and effective for opening said first damper when said rotatable member is rotated in one direction and for assisting in the closing of said first damper when said rotatable member is rotated in the opposite direction; a resilient member fixedly disposed with respect to said rotatable member; and detent means formed on said crank arm and cooperative with said resilient member for holding said rotatable member in a set position.

2. In a room air conditioning unit, the combination, comprising: an outer cabinet defining an apparatus compartment, an inner cabinet defining a cooling compartment, and a partition between said compartments; said cooling compartment having an air inlet and an air outlet communicating with a room to be cooled; said partition having a first opening therein communicating with both of said compartments for exhausting air from the room, and a second opening therein connecting the cooling compartment with the outside atmosphere for admitting fresh air to the room; first, second and third damper members pivotally mounted over the said first partition opening, said second partition opening, and said cooling compartment air inlet, respectively, and having said first and second dampers biased to closed positions; means operatively connecting said third damper to said second damper for conjoint movement therewith; a rotatable member having a crank arm affixed thereto and rotatable therewith; first means slidably connecting said crank arm to said first damper; second means slidably connecting said crank arm to said second damper; said first and second means being operatively arranged so that when said rotatable member is rotated in one direction said first damper is opened without opening said second damper, and when said rotatable member is rotated in the opposite direction said second damper is opened without opening said first damper; locking means disposed proximate said first damper and associated with said first means and operative to prevent the accidental opening of said first damper when in its closed position; a resilient member fixedly positioned with respect to said rotatable member; and detent means formed on said crank arm and engageable with said resilient member for holding said rotatable member in a set position.

3. In an air conditioning unit having outer and inner compartments with a partition therebetween and having an air inlet opening and an air exhaust opening in said partition with a hingedly mounted damper spring-biased to a closed position over each opening, an air flow control mechanism, comprising: a bracket member carried by the partition; a rotatable member rotatably mounted in said bracket; a crank arm carried by said rotatable member and having a slotted opening therein; a traverse rod having one end thereof slidably mounted in said slotted opening, and having the opposite end of said rod pivotally secured to the inlet damper and effective for opening the inlet damper upon rotation of said crank arm in a first direction and for closing the inlet damper upon rotation of said crank arm in a second direction; guide means formed on said bracket for controlling the path of the slidably mounted end portion of said traverse rod during the opening and closing of said inlet damper; lost-motion linkage connecting said crank arm to the exhaust damper and effective for opening the exhaust damper upon rotation of the crank arm in said second direction and for closing the exhaust damper upon rotation of the crank arm in said first direction; locking means carried by said lost-motion linkage and operative for preventing the accidental opening of said exhaust damper when in its closed position; a resilient member mounted on said bracket member; and detent means formed on one end of said crank arm and cooperative with said resilient member for holding the inlet and exhaust dampers in opened and closed positions.

4. In an air conditioning unit having outer and inner compartments with a partition therebetween and having an air inlet opening and an air exhaust opening in said partition with a hingedly mounted damper spring-biased to a closed position over each opening, an air flow control mechanism, comprising: a partition bracket member carried by the partition; a rotatable member rotatably mounted in said partition bracket; a crank arm carried by said rotatable member and having a slotted opening therein; a first traverse rod having one end thereof slidably mounted in said slotted opening, and having the opposite end of said rod pivotally secured to the inlet damper and effective for opening the inlet damper upon rotation of said crank arm in a first direction and for closing the inlet damper upon rotation of said crank arm in a second direction; guide means formed on said bracket for controlling the path of the slidably mounted end portion of said first traverse rod during the opening and closing of said inlet damper; motion-transmitting mechanism including, a second traverse rods with one end thereof pivotally attached to said crank arm, a pivotally mounted bell crank having a longitudinally extending slotted opening in one end thereof for slidably receiving the other end of said second traverse rod, a pull rod having one end thereof pivotally mounted in the other end of the bell crank, and a bracket affixed to the exhaust damper and having the other end of the pull rod slidably mounted therein and effective for opening the exhaust damper upon rotation of the crank arm in said second direction and for closing the exhaust damper upon rotation of the crank arm in said first direction; locking means including, a coil spring reactive between said exhaust bracket and said pull rod, and a resilient clip member fastened to one end of the said pull rod and having said coil spring operative to rotate said bell crank into an over-center position so that the said resilient clip engages said bell crank and restricts the further rotation thereof thereby preventing the accidental opening of the exhaust damper when in its closed position; a resilient member mounted on said partition bracket member; and detent means formed in one end of said crank arm and cooperative with said resilient member for holding said inlet and exhaust dampers in a set position.

5. In an air conditioning unit having outer and inner compartments with a partition therebetween and having an air inlet opening and an air exhaust opening in said partition with a hingedly mounted damper spring-biased to a closed position over each opening, an air flow control mechanism, comprising: a bracket member having one long and one short arm and being secured proximate one end of said long arm to the partition; a rotatable member rotatably mounted in the long and short arms of said bracket; a crank arm carried by said rotatable member and disposed for rotation between the long and short arms of said bracket; said crank arm having a slotted opening proximate a free end thereof; a traverse member having one end thereof slidably mounted in said slotted opening, and having an opposite end thereof pivotally secured to the inlet damper and effective for opening the inlet damper upon rotation of said crank arm in a first direction and for closing the inlet damper upon rotation of said crank arm in a second direction; guide means on said bracket short arm for guiding said traverse member during the opening and closing of the inlet damper; lost-motion linkage connecting the free end of said crank arm to the exhaust damper and effective for opening the exhaust damper upon rotation of said crank arm in said second direction and for closing the exhaust damper upon rotation of the crank arm in said first direction; a resilient member supported on said bracket member; and detent means formed on the end of said crank arm adjoining the said rotatable member and engageable with said resilient member for holding said inlet and exhaust dampers in a set position References Cited in the file of this patent

UNITED STATES PATENTS

| | | |
|---|---|---|
| 22,303 | Jewell | Apr. 20, 1943 |
| 2,343,122 | Eberhart | Feb. 29, 1944 |
| 2,408,972 | Eberhart | Oct. 8, 1946 |
| 2,408,973 | Cody | Oct. 8, 1946 |